United States Patent [19]

Nobusawa

[11] 4,008,965

[45] Feb. 22, 1977

[54] METHOD AND DEVICE FOR USE IN DETECTING A PRECISE FOCUSING POINT

[75] Inventor: Tsukumo Nobusawa, Tokyo, Japan

[73] Assignee: Asahi Optical Co., Ltd., Tokyo, Japan

[22] Filed: May 9, 1973

[21] Appl. No.: 358,521

[30] Foreign Application Priority Data

| May 6, 1972 | Japan | 47-44222 |
|---|---|---|
| May 6, 1972 | Japan | 47-44223 |
| June 17, 1972 | Japan | 47-60025 |
| July 31, 1972 | Japan | 47-75960 |
| July 31, 1972 | Japan | 47-75961 |

[52] U.S. Cl. .................. 356/125; 356/226; 250/201; 354/25; 331/66

[51] Int. Cl.² ............... G01B 9/00; G03B 7/08; H03F 1/00

[58] Field of Search ............ 331/137, 66, 108 B; 356/226, 123, 124, 125; 354/25; 250/201

[56] References Cited

UNITED STATES PATENTS

| 2,100,755 | 11/1937 | Shepard | 356/226 |
|---|---|---|---|
| 3,378,788 | 4/1968 | Barber | 331/137 |
| 3,418,418 | 12/1968 | Wilder | 331/137 |
| 3,562,785 | 2/1971 | Craig | 356/123 |
| 3,688,673 | 9/1972 | Katsuyama | 356/123 |

Primary Examiner—John K. Corbin
Assistant Examiner—Conrad Clark
Attorney, Agent, or Firm—Lane, Aitken, Dunner & Ziems

[57] ABSTRACT

A method and device for use in detecting a precise focussing point, which comprises the steps of: placing a photoelectric element on an optical path or optical axis of a lens of a camera; converting the information of the precise focussing point for a photographic object into a frequency variation of an A. C. signal; feeding said signal having varying frequency to a highly sensitive frequency detector such as a resonance circuit, a tuned amplifier, or frequency-amplitude convertor having acute frequency characteristics; and detecting the precise focussing point with high sensitivity by means of the output thus obtained; whereby the aforesaid functions may be satisfactorily performed, irrespective of the variation in the luminance of the object and whereby the focus of the lens may be brought into precise conformity to the predetermined plane (i.e., the position corresponding to a film). According to another aspect of the invention, there is provided an automatic focus adjusting means utilizing the differential outputs thus obtained.

21 Claims, 28 Drawing Figures

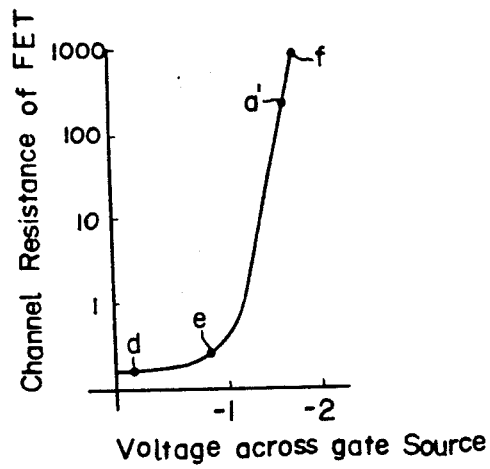
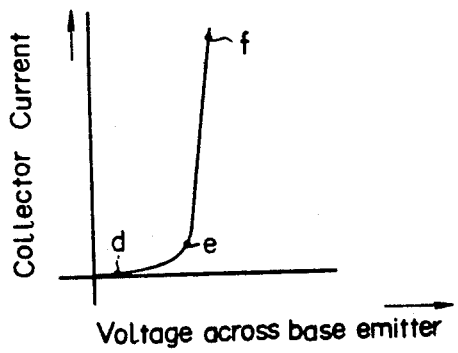
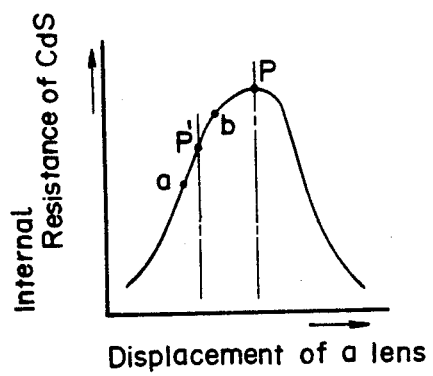
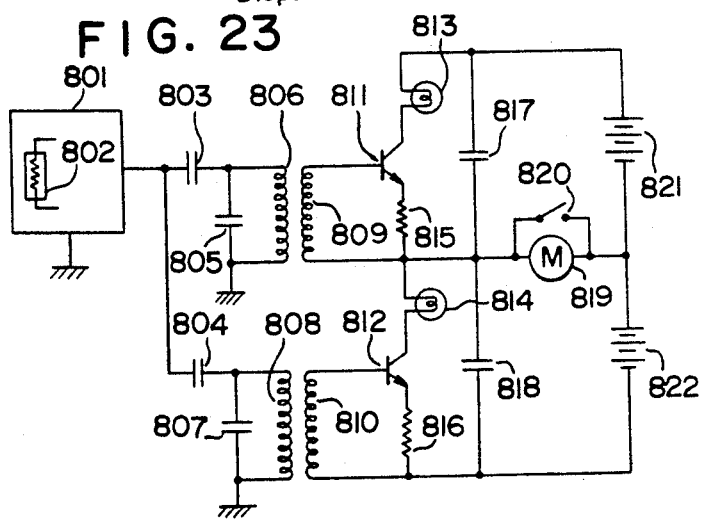

FIG. 24
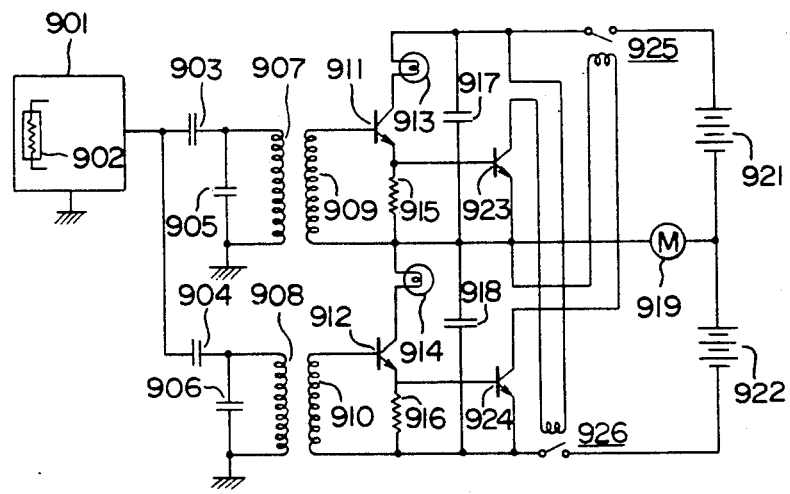
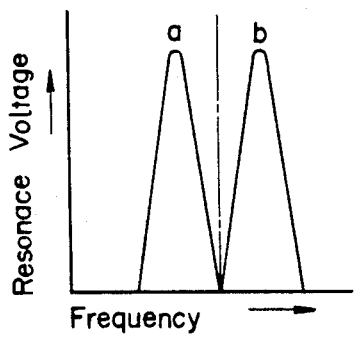
FIG. 25(A)
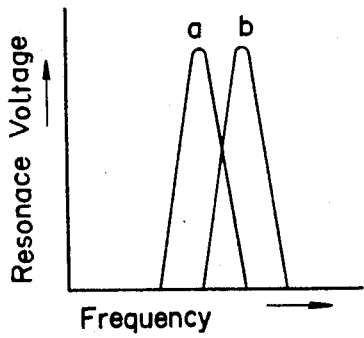
FIG. 25(B)
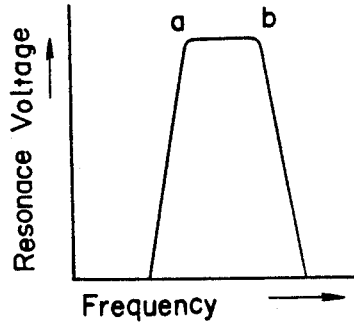
FIG. 25(C)

METHOD AND DEVICE FOR USE IN DETECTING A PRECISE FOCUSING POINT

CROSS-REFERENCE TO RELATED APPLICATION

This application is related to copending application Ser. No. 358,525 filed May 9, 1973 by Tsukumo Nobusawa entitled "Device for Detecting a Precise Focusing Point and an Automatic Focus Adjusting Device", now U.S. Pat. No. 3,829,866.

BACKGROUND OF THE INVENTION

1. Field of the Invention

This invention relates to a method and device for use in detecting a precise focussing point for the purpose of bringing the focus of a lens into precise conformity with a predetermined plane, and further to a specific automatic focus adjusting device.

2. Description of the Prior Art

As is well known, when the focussing information is imparted through a lens to a photoelectric element or cell, such as cadmium sulfide, placed on a predetermined plane on the optical axis or optical path of said lens, with said lens being shifted, then the internal resistance of said cadmium sulfide (which will be referred to as 'CdS' hereinafter) will present the focussing characteristic curve as shown in FIG. 1 (A). In this respect, when the luminance of the photographic object varies, the total height of the focussing characteristic curve will vary therewith, whereas the position of the maximal point will remain unchanged. In FIG. 1 (A), shown at a point P on the curve is a precise focussing point of the object, at a point (a) the position displaced ahead of the precise focussing point and at a point (b) the position displaced rearwards thereof. To obtain the precise focussing point from the variation in the internal resistance of the CdS having such characteristics, the CdS is inserted in a D.C. circuit to thereby convert the variation in the internal resistance into that of an electric current, whereby the precise focussing point P is detected by means of the electric current thus obtained. However, there arise difficulties in that, due to the fact that in the internal resistance of the CdS at the vicinity of the precise focussing point P is very small there results a small variation in the electric current which would be obtained subsequent to such conversion to electric current, so that the detection of the precise focussing point becomes difficult. In addition, due to the small variation in the electric current, the variation thereof will fail to be maintained constant when subjected to the voltage or temperature variations in the circuits, thereby presenting inaccurate detection of the precise focussing point. To avoid those shortcomings, there has been proposed an attempt, in which two CdS photoelectric cells are placed on the optical axis at positions corresponding to those of the front and rear points (a) and (b) of FIG. (A), whereby to differentially detect the focussing information of the object, i.e., by obtaining the mid point between the points (a) and (b) where the internal resistances of the CdS photocells become equal to each other.

This presents no objectional matter in the case where the internal resistance of the CdS varies symmetrically with respect to the precise focussing point P, and the precise focussing point P can be detected according to the aforesaid differential means. However, there arises a possibility, on the other hand, of obtaining an inaccurate detection of the point P, because the internal resistance of CdS varies non-symmetrically as shown in FIG. 1 (B), with respect to the precise focussing point P, depending on the CdS used.

SUMMARY OF THE INVENTION

It has been found that these and other objects can be readily attained in the method and device of the present invention.

Accordingly, it is a principal or the first object of the present invention to provide a method and device for use in detecting the precise focussing point of a photographic object, which comprises the steps of converting the focussing information of the object i.e., the focussing target, into frequency variation of an A.C. signal and feeding the A.C. signal having varying frequencies to a frequency detector of a high sensitivity, to thereby detect the signal of a frequency corresponding to the required precise focussing point.

According to the present invention, taking note of the fact that, when the predetermined focal plane is brought into a condition corresponding to the extreme value on the focussing characteristic curve, the point spaced a given distance on the optical axis or optical path from said focussing plane will assume a specific value in a manner commensurate with the shape of the focussing characteristic curve, the location of the photocells as used in the present invention is not be limited merely to that on the predetermined focussing plane, but is extended to a point on the optical path spaced a given distance from said predetermined focussing plane, i.e., the point corresponding to the sloped portion of the focussing characteristic curve. In this manner, by regarding such point of the photocell as the detecting reference point, the precise focussing point may be detected by means of a specific frequency detector, which uses the frequency of the A. C. signal, by obtaining the focussing information inherent to said point, which information would be produced when said point is brought into conformity to the predetermined focussing plane.

It is the second object of the invention to provide a device for use in detecting the precise focussing point, which incorporates the principles of converting the focussing information of the photographic object i.e., the focussing target having a constant luminance, into a given electric oscillation frequency, feeding the oscillation frequency thus obtained to the tuning or resonance circuit to thereby take out only the required focussing-target-oxcillation-frequency, while said device is adapted to be free from the influence of the temperature change and fluctuation in voltage.

It is the third object of the invention to provide a device for use in detecting the precise focussing point, which incorporates the principle of bringing the resonance frequency of the resonance circuit adapted to take out the focussing-target-oscillation-frequency into synchronizing oscillation with the electric oscillation frequency based on the focussing information of the target focussing object, whereby the precise focussing point can accurately be detected despite the variation in the luminance, being free from the influence due to the variations in temperature and voltage.

It is the fourth object of the invention to provide a device for use in detecting the precise focussing point, which incorporates the principle of feeding said oscillation frequency to a tuned amplifier with whose central frequency is set so as to correspond to the precise focussing point, to thereby permit the detection of the precise focussing point by means of the output when the oscillation frequency is brought into conformity with the central frequency, or otherwise by setting the resistance of the photocell, other than the maximum value, to correspond to a predetermined frequency at the precise focussing point, such that the central frequency of the tuned amplifier may follow the variation in the luminance, even if the luminance of the photographic object is varied, to thereby permit the detection of the focussing information.

It is the fifth object of the invention to provide a method and device for use in detecting the precise focussing point, which includes the steps of feeding said oscillation frequency to a frequency-amplitude convertor to thereby convert the frequency variation into an amplitude variation of the electric current in an attempt to detect the maximum and minimum values thereof, such that the detection of the precise focussing point can be accomplished with minimized error but with high sensitivity.

It is the sixth object of the invention to provide a device for use in detecting the precise focussing point, which incorporates the principle of converting into the electric signal the focussing information from photocells placed on the optical axis or the optical path of a lens, controlling by said signal the oscillation-frequency-setting-element of the oscillation circuit, to thereby spread the region in the vicinity of the frequency corresponding to the precise focussing point and to thereby positively obtain the precise focussing point, while causing the output of the focussing information from the photocell to maintain a constant value.

It is the seventh object of the invention to provide a device for use in detecting the precise focussing point, which can eliminate the detecting error arising from the non-symmetrical focussing characteristic curve as referred to earlier, discriminating the orientations of front and rear pins with ease to thereby effect the precise focussing and furthermore to detect and maintain the precise focussing point in an automatically adjustable range beforehand.

To meet the seventh object of the invention, there is provided an automatic focus adjusting means which incorporates the principle of placing a photoelectric cell on the optical axis of a lens at a position spaced a given distance from the focal plane, i.e., at the position corresponding to the sloped portion of the focussing curve, detecting the focussing information inherent to said point, which information would be produced when the focal plane is brought into conformity to said point, while using said point as the detecting reference point, converting said information into electric oscillation frequency, and feeding said frequency to a pair of resonance circuits having resonance frequencies set at levels spaced symmetrically above and below the oscillation frequency obtained at the time of precise focussing, whereby to detect the difference in the outputs obtained from said circuits to thereby achieve the precise focussing.

It is the eighth object of the invention to provide an automatic focus adjusting means which can utilize the resonance effect differentially but effectively, by controlling the operation of one resonance circuit by using the output obtained from the other circuit, when the latter is subjected to resonance, in an attempt to prevent the objectionable influence of the acute resonance effect of resonance circuits, said influence being caused due to the interference in the resonance effects of a pair of resonance circuits whose resonance frequencies are very close to each other.

These and other objects and features will be clear from the reading of the ensuing description of the present invention.

BRIEF DESCRIPTION OF THE DRAWINGS

FIG. 18 is a characteristic curve showing the relationship of the voltage across the gate source of the electric field effect transistor, to the channel resistance;

FIG. 21 is a characteristic curve showing the relationship of the voltage across the base emitters of a transistor, to the collector current;

FIG. 22 is a focussing characteristic curve illustrative of the operational principle of the automatic focus adjusting device of the present invention, utilizing the resonance effect differentially;

FIGS. 23 and 24 are circuit diagrams showing the embodiments of the automatic focus adjusting device of the present invention, respectively; and FIG. 25 is a characteristic curve illustrative of the influence due to the interference in the resonance effect of a pair of resonance circuits whose resonance frequencies are close to each other.

DESCRIPTION OF THE PREFERRED EMBODIMENTS

Figure 3:
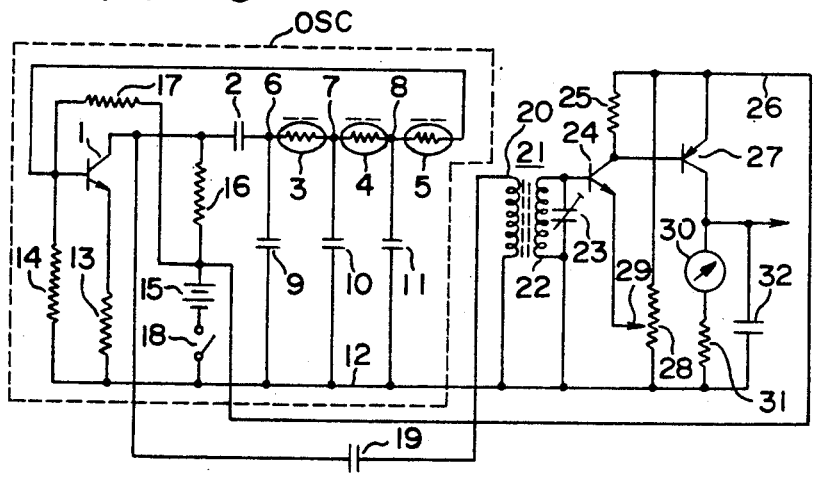
FIG. 3 is a circuit diagram of the embodiment of the present invention, using the resonance circuits for detecting the variation in the frequency.

Referring now to FIG. 3 wherein there is shown an embodiment directed to accomplishing the second object of the invention, encompassed with the dotted line is a capacative/resistive (CR) phase-shifting oscillation circuit, in which the collector of a transistor 1 is connected to one end of a condensor 2, with the other end of said condensor 2 being connected, via seriesly connected CdS photocells 3, 4 and 5 placed at arbitrary points on the optical axis of a lens of a camera, to the base of the transistor 1. Connected to the common junction point 6 for both condensor and CdS 3, the common junction point 7 for both CdS 3 and CdS 4 and the common junction point 8 for both CdS 4 and CdS 5 are one end of the condensors 9, 10 and 11, respectively, with the other end of said condensors being connected to an earth bus 12. The emitter and base of the transistor 1 are connected via resistor 13 and resistor 14 to the earth bus 12, respectively. Shown at 15 is a D.C. electric power source, whose positive side is connected via resistor 16 and resistor 17 to the collector and base of transistor 1, respectively, and whose negative side is connected via switch 18 to the earth bus 12. The frequency (f) is expressed as follows, assuming the internal resistors of the CdS photocells 3, 4 and 5 being R, respectively, and the capacities of the condensors 9, 10 and 11 being C:

$$f = 1/2\pi CR.$$

The oscillation output of said CR sinusoidal oscillation circuit OSC is connected, via condensor 19 connected to the collector of the transistor 1, to one end of a coil 20, while the other end of said coil 20 is connected to the earth bus 12. Shown at 21 is a resonance circuit consisting of coil 22 connected in parallel with a semi-fixed condensor 23, while one end of the parallel juction point is connected to the base of the transistor 24 and the other end of said junction joint to the earth bus 12. The collector of the transistor 24 is connected via a resistor 25 to a positive bus 26 connected to the positive side of the D.C. power source as well as to the base of the transistor 27.

The emitter of the transistor 24 is connected to the sliding element 29 of a variable resistor 28 which is connected to a point between the positive bus 26 and the earth bus 12, while the variable resistor 28 is adapted to render the transistor 24 conductive, only in case that the resonance circuit causes resonance to thereby set the operational point thereof. The emitter of the transistor 27 is directly connected to the positive bus 26, while the collector thereof is connected, via D.C. circuit involving a precise focussing point meter 30 and a resistor 31, to the earth bus 12, with the A.C. by-pass condensor 32 connected in parallel to said D.C. circuit.

The operation of the device for use in detecting the precise focussing point will now be described.

Figure 1:
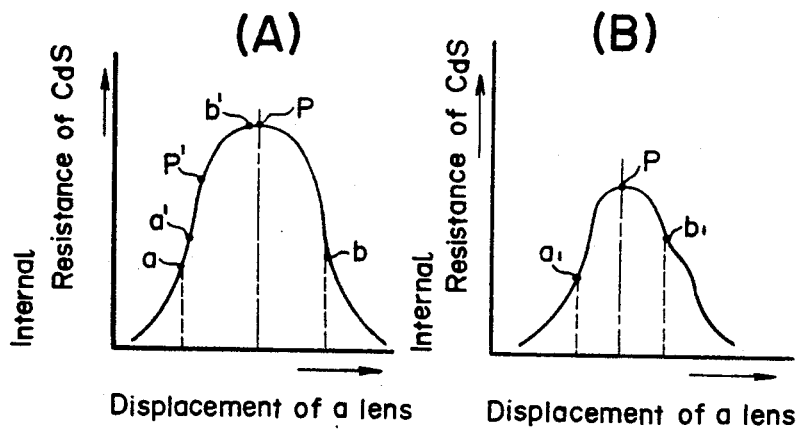
FIG. 1 is an internal resistance curve of a photoelectric cell (CdS) whose resistance varies with the displacement of a lens.
Figure 2:
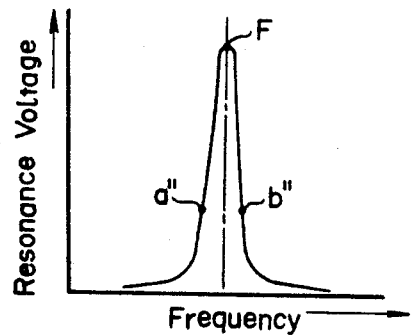
FIG. 2 is a resonance characteristic curve of a resonance circuit.

When the switch 18 of the CR oscillation circuit OSC is closed, with the lens cylinder being shifted to thereby impart the focussing information of the target focussing object to CdS photocells 3, 4, and 5 (in this respect, the iris is constant), then the internal resistances of the CdS photocells 3, 4 and 5 will vary with the displacement of the lens cylinder as shown in FIG. 1 (A), while the CR oscillation circuit OSC will begin to oscillate at a frequency dependent on the capacities of the condensors 9, 10 and 11. The oscillation frequency output is fed through condensor 19 and coil 20 to the resonance circuit 21. If the resonance characteristic of the resonance circuit 21 is designed to present an acute characteristic (with high Q) as shown in FIG. 2 and the resonance circuit 21 is preset in a manner to cause the resonance at an oscillation frequency determined by the internal resistance inherent to and presented by the point P', when the focus plane is brought into conformity to the precise focussing reference point P' of FIG. 1, then the resonance voltage of the resonance circuit 21 will become maximal at the precise focussing point and thereafter will decrease sharply as it departs from said focussing point. The aforesaid resonance voltage will be impressed onto the base of the transistor 24 to a value over the voltage preset by means of the variable resistor 28, thus rendering the transistor 24 conductive, while the output thereof will be amplified at the transistor 27 and then fed to the precise-focussing-point-detecting meter 30 for actuation. The actuation of the meter will determine if the precise focussing point is detected. This meter 30 will present a voltage (point a'' and b'' of FIG. 2) lower than that of the resonance point F of the resonance circuit 21 by means of the frequency obtained at a point other than the precise focussing point, i.e., the point a' of the front pin and the point b' of the rear pin in FIG. 1 (A), such that it fails to render the transistor 24 conductive.

The output of said transistor 27 is used to operate a servomechanism (not shown) adapted to shift the lens. In addition, since the resonance voltage can be increased Q times, the setting of the level of the transistor 24 can be readily accomplished.

Thus, if the precise focussing point is detected by using the resonance characteristics, the Q of the resonance circuit 21 may be increased, with the resultant acute resonance characteristic curve, such that the resonance voltage at the resonance point may be increased Q times. This permits accurate detection of the precise focussing point and the protection from the erroneous detection of the precise focussing point due to the influence of the noise or the like. Furthermore, the CR oscillation circuit OSC and the resonance circuit 21 are not likely to be subject to the influence of the temperature, permitting the stable detection of the precise focussing point.

In passing, although the focussing reference point is set as being point P' in FIG. 1 (A) in this embodiment, it may be set as being the point P.

In the embodiment as shown in FIG. 3, if the luminance of the object is substantially constant, then there is no appreciable change in the internal resistance of the CdS. Accordingly, once the resonance frequency of the resonance circuit is set, then the precise focussing point may be detected repeatedly with accuracy.

Figure 4:
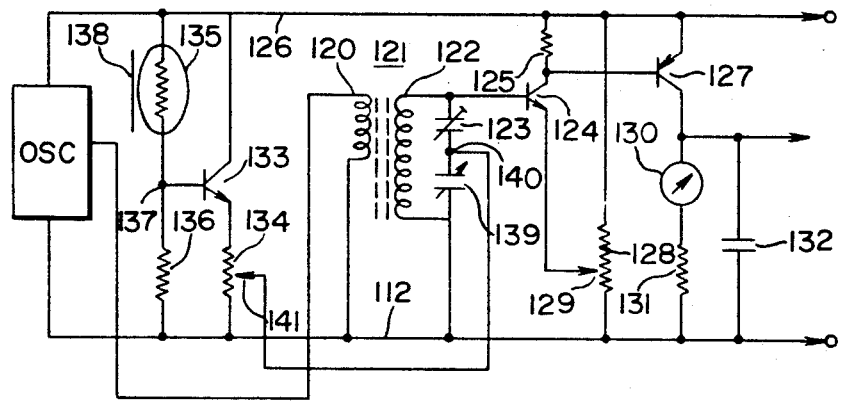
FIGS. 4 and 5 are circuit diagrams each showing one embodiment of the present invention, with compensating means added to the variation in luminance, respectively.
Figure 5:
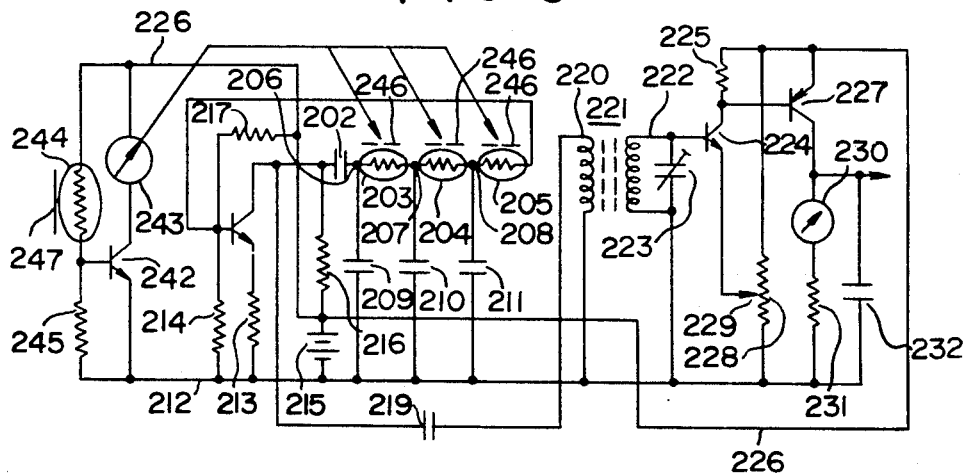

FIGS. 4 and 5 show the embodiment of device for detecting the precise focussing point for accomplishing the third object of the invention, in which the like number last two digits) represents the like part to avoid the duplicate description.

In these and the other embodiments to be discussed, the three-digit reference numbers are organized such that the first digit identifies the embodiment (hundreds digits 1 through 9).

As shown in FIG. 4, the collector of the transistor 133 is connected to the earth bus 112, while the base thereof is connected to the common junction point 137 of the series circuit including the resistor 136 and the CdS 135, the both of which are inserted between the positive bus 26 and the earth bus 112.

Disposed in front of the CdS 135 is a diffusion plate 138 which is adapted to permit the diffusion and transmission of the radiation from the object to thereby detect the luminance of the radiation from the object. The resonance circuit 121 consists of the coil 122 and the series circuit including the semi-fixed condensor 123 and the voltage variable capacity diode 139, said coil 122 being connected in parallel to said series circuit. Connected to the common junction joint 40 for the condensor 123 and the diode 139 is a sliding element 141 of a variable resistor 134.

In the embodiment as shown in FIG. 4, the variation in the luminance of the object will vary the internal resistance of the CdS 135. On the other hand, the variation of the luminance will vary the oscillation frequency of the focussing information. A decrease in the luminance will lead to a decrease in the oscillation frequency, and therefore it is necessary to lower the frequency of the resonance circuit 121. The decrease in the luminance will result in the increase in the internal resistance of the CdS 135, and therefore the collector current of the transistor 133 is lowered. This in turn leads to voltage drop across the variable resistor 141, thereby increasing the capacity of the variable capacity diode 139 resulting in a decrease in resonance frequency of the resonance circuit 121. Accordingly, even if the luminance of the object decreases, since the resonance frequency of the resonance circuit 121 decreases accordingly the precise focussing point of the target focus may be detected accurately. Conversely, increased luminance will result in an operation which is the reverse of the foregoing operation.

Meanwhile, in the embodiment in FIG. 4, the resonance frequency of the resonance circuit 121 is controlled by means of the luminance of the object. However, the inductance of the coil 122 of the resonance circuit 121 may be controlled by means of the semiconductor such as gyrator.

Turning now to FIG. 5 which shows another embodiment of the invention, the emitter of the transistor 242 is connected to the earth bus 212, while the collector is connected, via driving means 243 such as a small ammeter, to the positive bus 226, and the base thereof is connected to the common junction point in the series circuit, of the CdS 244 and resistor 245, the both being inserted between the earth bus 212 and the positive bus 226. The aforesaid driving means 243 is mechanically driven in conjunction with the light sensing condition of the CdS 244 to thereby vary an iris 246. Shown at 247 is a diffusion plate which is adapted to diffuse the radiation from the object, which is to be projected on the CdS 244. Assume that the luminance of the object is lowered, then the oscillation frequency of the focussing information will be lowered, while the lowered luminance is detected at CdS 244, thereby increasing the internal resistance thereof which in turn will decrease the collector current of the transistor 242. This further leads to the actuation of the driving means which will cause the iris 246 to open wider, such that the internal resistances of CdS photocells 203, 204 and 205 will be lowered by means of the focussing information, thus causing the oscillation of the precise focussing frequency. Then, the oscillation frequency will cause resonance in the resonance circuit 221 to thereby effect the detection of the precise focussing point. On the other hand, in the case of the increased luminance of the object, the iris 246 will be made smaller in contrast to the previous case so as to control the focussing information of the focussing target object incident on the CdS photocells 203, 204 and 205, thereby accomodating the internal resistance of the CdS to the oscillation frequency of the precise focussing point, while permitting the accurate detection of the focussing point.

In passing, in FIG. 5, the driving means 243 is designed to operate in conjunction with the iris 246. However, the midzet variable condensor may be used in place of condensors 209 - 211, said variable condensor being so designed as to operate in conjunction with the driving means 243 to vary the oscillation frequency. Otherwise, a variable capacity condensor may be used in place of the condensors 209 - 211 in an attempt that said diode may control the oscillation frequency by means of control voltage as obtained through means shown in FIG. 4. Furthermore, the mechanical means as shown in FIG. 5 may be applied to the midzet variable condensor which replaces the variable capacity diode 139 shown in FIG. 4, or to the magnetic iron core which is adapted to vary the inductance of the coil 222.

Figure 6:
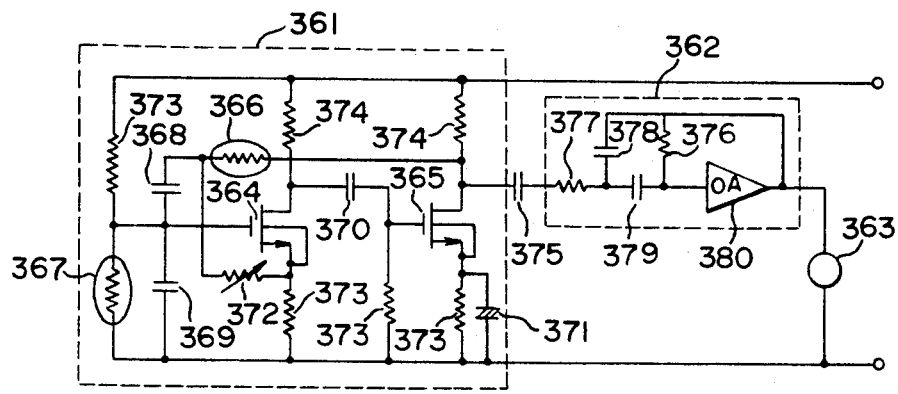
FIG. 6 is a circuit diagram of one embodiment of the invention, using a synchronous amplifier for detecting the variation in frequency.

FIG. 6 shows the embodiment which is to accomplish the fourth object of the invention. The oscillation circuit 361 consists of electric field effect transistors (FET) 364 and 365, focus information detecting CdS photocells 366 and 367 placed on the optical axis of a lens or the optical path thereof, oscillation-constant-setting-condensors 368 and 369, coupling condensor 370, by-pass condensor 371, variable resistor 372, bias setting resistor 373, and load resistor 374. The oscillation output from the oscillation circuit 361 is fed via coupling condensor to a tuned amplifier 362. The synchronous amplifier 362 consists of selected-frequency-setting-resistors 376 and 377, selected-frequency-setting condensors 378 and 379 and operational amplifier 380.

Figure 7:
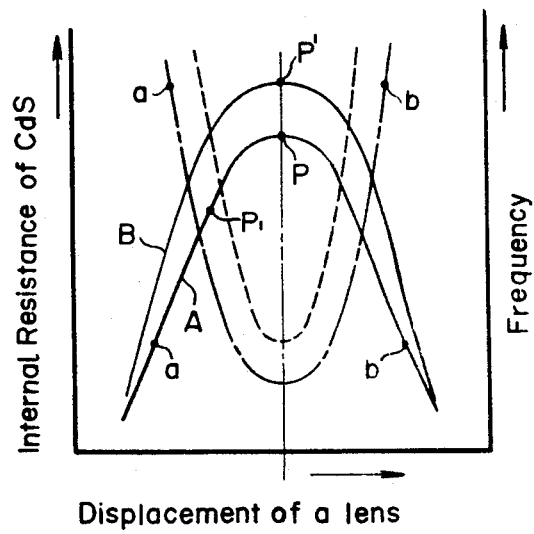
FIG. 7 is a curve of variation in the oscillation frequency, referring to the focussing characteristic curve illustrating the operational principle of the embodiment of FIG. 6.

The operation of the embodiment thus constructed will now be described. The CdS photocells 366 and 367 are placed on an optical axis of a lens or the optical path thereof at a position corresponding to the point $P_1$ on the focussing characteristic curve A of FIG. 7, and the lens is moved back and forth to thereby impart the focussing information to the photocells 366 and 367, then the oscillation frequency of the oscillation circuit 361 will vary with the displacement of the lens in a manner as shown by the dotted line in FIG. 7.

Assuming the resistance of the photocells 366 and 367 is R and the resistance of the condensors 368 and 369 is C, then the oscillation frequency $f_1$ of the oscillation circuit 361 like that of the Wien-bridge oscillator will be as follows:

$$f_1 = 1/2\pi CR \qquad (1)$$

The oscillation signal from the oscillation circuit 361 is fed via condensor 375 to the tuned amplifier 362. The tuning center angle frequency w will be given as follows:

$$w = \sqrt{(C_1 C_2 R_1 R_2)}$$

Assuming $C_1=C_2=C_o$, $R_1=R_2=R_o$ in the formula (2), then the formula (2) will be as follows:

$$w = 1/C_o R_o \qquad (3)$$

The synchronizing frequency $f_2 = 1/2\pi C_o R_o$ (4)

When the aforesaid oscillation frequency $f_1$ becomes equal to the tuning frequency $f_2$, then $f_1$ will be selected by means of the tuned amplifier 362, thereby driving the meter of the precise-focussing-point-indicating-means 363 for the detection of the precise focussing point. However, if the luminance of the object becomes lowered, then the focussing characteristic curve will be as the curve B in FIG. 7, with the resultant increase in the resistance at the point P, thereby shifting to the point P'. For this reason, the oscillation frequency of the oscillation circuit 361 will be such as shown by the one point chain line in the same figure, although, with the embodiment of the invention, it is possible to detect the required precise focussing point P without any obstacle, even though the oscillation frequency may vary due to the varying luminance of the object.

For this purpose, the resistors 376 and 377 of the tuned amplifier 362 are replaced with CdS to thereby detect the variation in the luminance of the object, and thus the tuning frequency $f_2$ of the tuned amplifier 362 can vary the selected frequency depending on the luminance of the object. Assuming that the resistance R of the CdS photocells 366 and 367 in the oscillation circuit 161 are equal to the resistance $R_o$ of the CdS photocells of the tuned amplifier 362 and that the condensors 368 and 369 of the oscillation circuit 361 are equal to the condensors 378 and 379 of the tuned amplifier 362, then the oscillation frequency $f_1$ dependent on the luminance of the object and the central frequency of the tuned amplifier 362 vary equally as is clear from the formulas (1) and (4). Accordingly, even if there is variation in the luminance, the relationship such as $f_1 = f_2$ can be maintained, thus permitting the positive detection of the precise focussing point irrespective of the variation in the luminance of the object.

Figure 8:
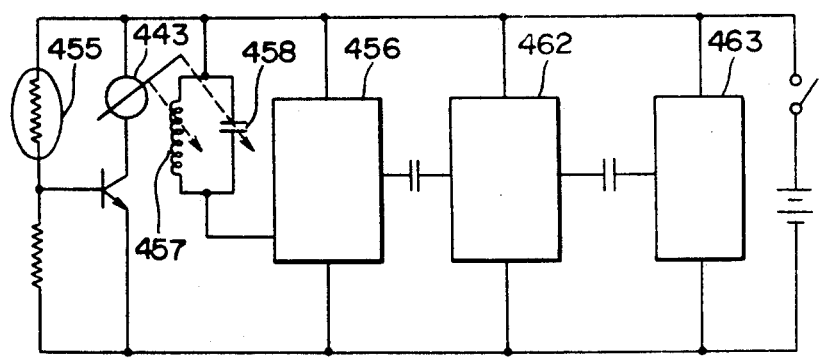
FIG. 8 is a diagram showing other embodiment of the invention, in which an oscillation circuit serves as a L C oscillation circuit.

FIG. 8 shows another embodiment of the invention, in which the oscillation circuit is replaced with LC oscillation circuit. With this embodiment, either of the coil 457 and condensor 458 of the LC oscillation circuit 456 may be controlled by means of a driving means 443 whose electric current varies with the internal resistance of the CdS photocells 455 used for the focussing information detection. Blocks 462 and 463 in FIG. 8 correspond to elements 362 and 363 of FIG. 6.

For a control purpose, the variable condensor may be directly rotation-driven in the case of the condensor 458, while inductance may be varied in the case of the coil 457. In general, the oscillation frequency $f_3$ of the LC oscillator may be expressed as follows:

$$f_3 = 1/2\pi \sqrt{LC}$$

Assuming L as being constant, if the variation in C is varied in a squared manner, then the formula (5) will be given as follows:

$$f_3 = (1/2\pi C \sqrt{L})$$

The formula (6) corresponds to the aforesaid formula (1), such that the present invention can be practiced, using the LC oscillation circuit.

Figure 9:
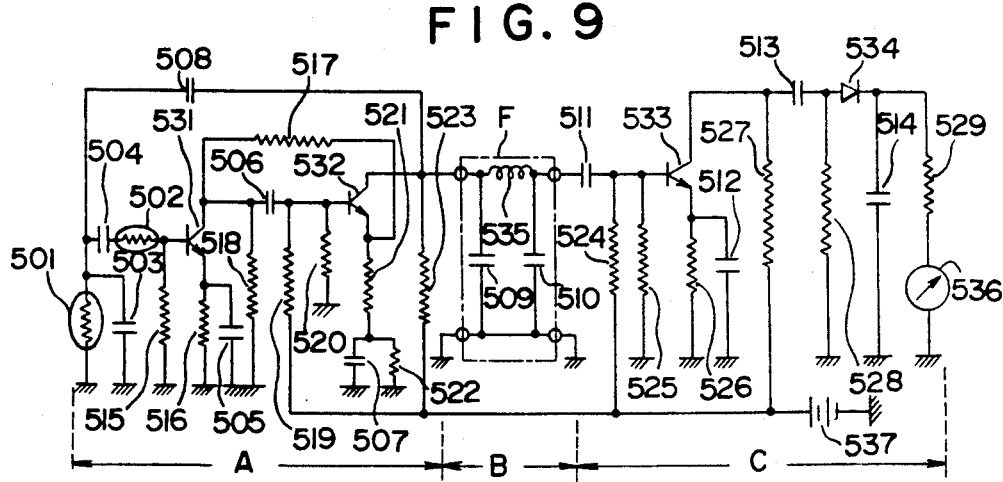
FIG. 9 is a circuit diagram of one embodiment of the present invention, using a low range wave filter as the frequency-amplitude convertor for detecting the variation in frequency.
Figure 10:
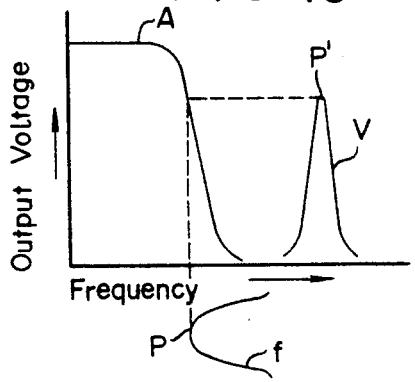
FIG. 10 is a characteristic curve showing one example of the characteristics of the low range wave filter and another example of the variation in the output voltage in the case of the oscillation output being imparted thereto.

FIG. 9 shows the embodiment to accomplish the fifth object of the invention. The section A represents focussing-information-frequency convertor utilizing a known CR oscillation circuit, the section B does the frequency-amplitude conversion utilizing the low range wave filter, the section C does the precise-focussing-information-indicating-means and the amplifier detector. Shown at 501 and 502 are CdS photocells to be placed on the predetermined focussing plane, i.e., the plane corresponding to the film plane, shown at 503 to 508 are condensors, at 515 to 523 resistors, and at 531 and 532 are transistors which are connected as shown in section A, constituting the Wien-bridge oscillation circuit. In section B, shown at 510 is a condensor, at 535 an inductance, both being connected in type as shown encircled by the dotted line, constituting a known low range wave filter. One of the examples of the frequency characteristics thereof is shown in FIG. 10 A. In section C, shown at 524 to 529 are resistors, at 511 to 514 condensors, at 533 a transistor, at 534 diode, at 536 a meter, at 537 a power source, all being connected as shown, constituting the amplifier detector and the precise-focussing-information-indicating-means.

With the arrangement as shown in FIG. 9, the circuit including CdS photocells 501 and 502 and condensors 503 and 504 serve as a phase shifting circuit. The oscillation frequency (f) of the Wien-bridge oscillation circuit is expressed as follows:

$$f = 1/2\pi \sqrt{C_1 C_2 R_1 R_2},$$

where the internal resistances of the photocells 501 and 502 are $R_1$ and $R_2$, and the capacities of the condensors 503 and 504 are $C_1$ and $C_2$, respectively. Accordingly, it can be seen from this that the focussing information is taken as the variation in the oscillation frequency as the function of the variation in the internal resistances $R_1$ and $R_2$.

The oscillation output (f) which tends to be subject to such frequency variation is fed to the low range wave filter as shown in section B. In this respect, the relation between the output (f) and filter characteristics should be such that the lowest portion of the oscillation output (f) is applied to the attenuation slope region of the characteristic curve of the wave filter, as shown in FIG. 10. Thus, there will be obtained for the output of the wave filter a sharp peak of the voltage variation as shown in FIG. 10 at V, depending on the variation in the input frequency. This voltage variation is fed to the amplifier detector of section C to thereby effect the amplification detection to yield the variation of the D.C. current which will then be indicated at a meter 536 as the precise focussing information, whereupon the detection of the precise focussing point may be achieved by detecting the maximal point P'.

In this respect, the voltage variation described will appear sharper, if the attenuation slope of the wave filter is sharper. The top of the focussing characteristic curve, shown in FIG. 7, as well as the bottom of the frequency curve may be sharpened readily, permitting the detection of the maximal point P' with high sensitivity.

Figure 11:
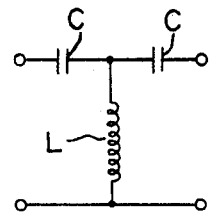
FIG. 11 is a circuit diagram showing one example of the high wave filter used as the frequency-amplitude convertor.
Figure 12:
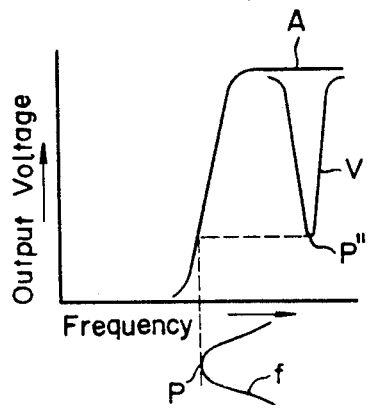
FIG. 12 is a characteristic curve showing one example of the characteristic of a high range wave filter, and the variation in the output voltage in the case of said filter being used as the frequency-amplitude convertor.

In another embodiment of the present invention, a high range wave filter as shown in FIG. 11 is used as the frequency-amplitude convertor shown in section B in FIG. 9. In FIG. 11, shown at each C is a condensor, at L is an inductance, the circuit being connected in a T shape as shown, constituting a known high range wave filter. One example of the frequency characteristics is shown in FIG. 12 at A.

The oscillation output from the section A of FIG. 9 is fed to the wave filter described. Likewise, as shown in FIG. 12, the relationship between the output (f) and the filter characteristics should be such that the lowest portion of the oscillation output (f) is applied to the attenuation slope region of the characteristic curve of the wave filter. Thus, there is obtained for the output of the wave filter an acute V shaped voltage variation, depending on the variation in the input frequency, and then the variation thus obtained is fed to the amplifier detector of section C in FIG. 9 to thereby effect the amplification-detection to yield the variation in D.C. current which will then be indicated at a meter 536 to detect the minimal point P' for the detection of the precise focussing point P. As in previous case, the sharper the attenuation slope characteristic of the wave filter, the better the sensivity of the detection.

Figure 13:
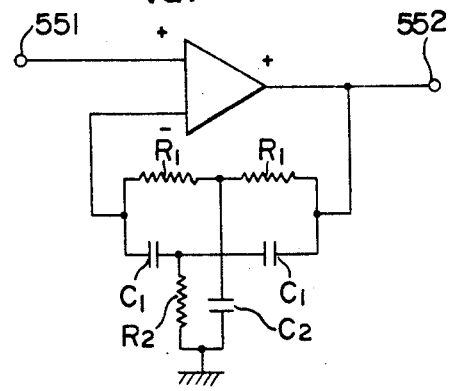
FIG. 13 is a circuit diagram showing one example of the active wave filter used as the frequency-amplitude convertor.
Figure 13:
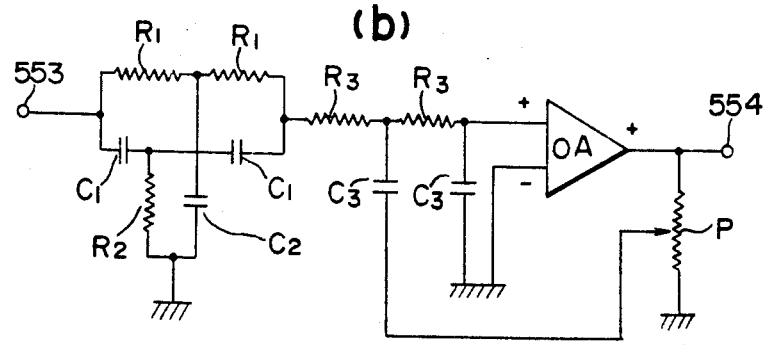

Although in the embodiments described thus far in connection with filters consisting merely of the inductance and condensors are used to obtain the better characteristics, there is a tendency that the number of elements required, shapes and weight thereof will be increased due to their nature. Particularly, such embodiments are not suited for use in a small scale of circuits for the low frequency region. To avoid this disadvantage, various types of active wave filters may be used which consists of the combinations of condensors, resistors and amplifiers, and which present a relatively acute characteristic, even if it is of a small size. Such a circuit is shown in FIG. 13, in which an operational amplifier is shown at OA, condensors at $C_1$ to $C_3$, resistors at $R_1$ to $R_3$, variable resistor at P, input terminal at 551 and output terminal at 552, both being connected as shown in the figure, while (a) in FIG. 13 represents a bandpass wave filter, and (b) a low-region/band-stop combined filter.

In passing, the embodiments described thus far all utilize the attenuation slope characteristics of the wave filter for the frequency-amplitude conversion. However, to practice the present invention, suitable means such as frequency discriminator, or attenuation slope circuit network may be used, so long the frequency-amplitude conversion presents acute frequency sensitivity.

Figure 16:
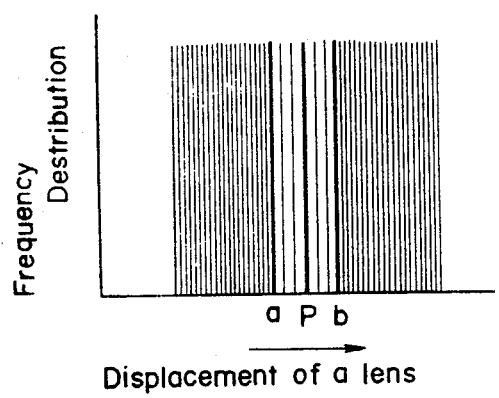
FIG. 16 is a distribution diagram of the frequency in case that the focussing information is converted into frequency.
Figure 15:
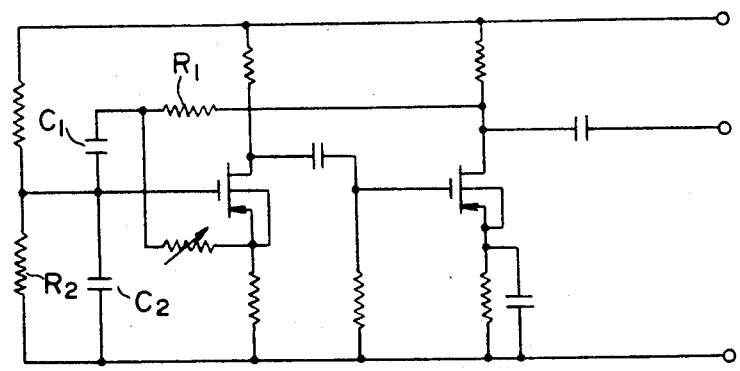
FIG. 15 is a circuit diagram of a known Wien-bridge type oscillation circuit.

The next embodiment accomplishes the fifth object of the invention. Before going further, reference will be had to the case where the CdS photocells are placed at the position corresponding to the focal plane on the optical axis of a lens, said photocells replacing the resistors $R_1$ and $R_2$ of Wien-bridge oscillation circuit in FIG. 15 (c.f., FIG. 6). When the lens is shifted to impart the focussing information to CdS, the frequency distribution of the output of the oscillation circuit will be such as is shown in FIG. 16. In FIG. 16, the vertical or upright line P denotes the precise focussing point frequency, and vertical lines a, b represent the frequencies in the neighborhood of the precise focussing point. As shown in FIG. 16, the further from the upright line P, the higher the frequency, such that the upright lines a and b present the frequencies higher than that of the upright line P. However, when the precise focussing point frequency is detected by means of, say, a resonance circuit, there is a possibility of detecting the wrong focussing point frequency by taking such frequencies as the precise focussing frequency. To avoid this shortcoming, it is recommendable to render larger the difference between the precise focussing point frequency and the frequencies at a and b. This principle is materizied in the embodiment of the invention to meet the sixth object thereof.

Figure 17:
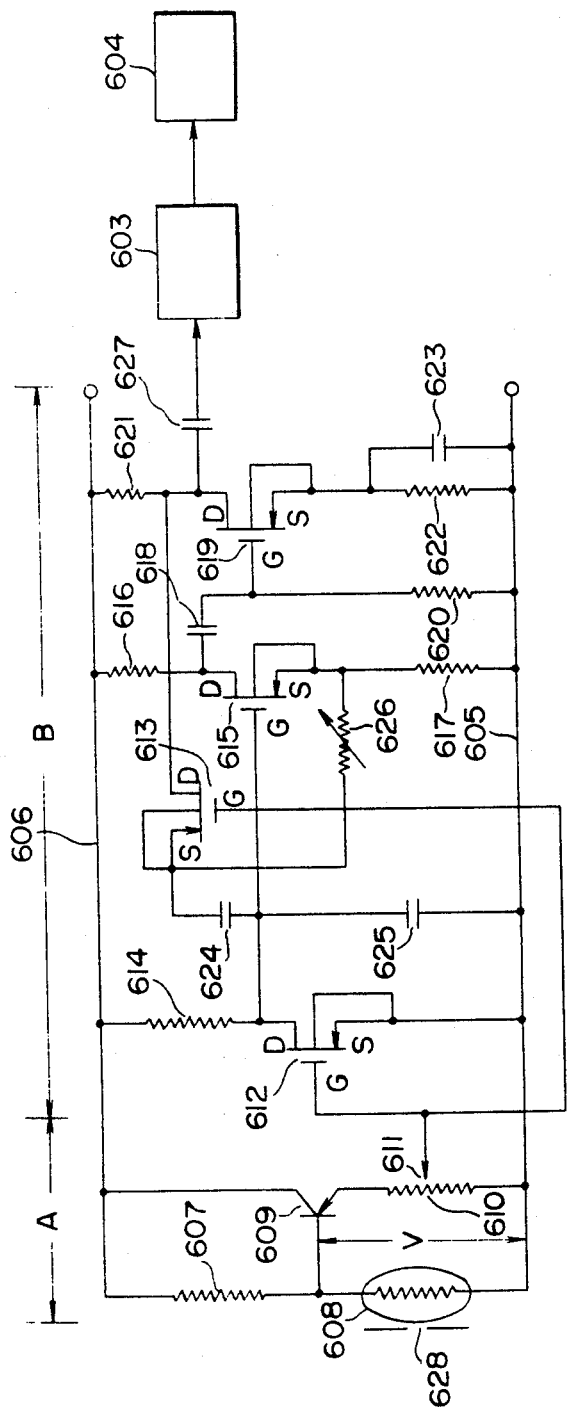
FIG. 17 is a circuit diagram showing the essential part of the embodiment of the present invention, with the frequency region in the vicinity of that corresponding to the precise focussing point being spread.

In FIG. 17, section A represents a focussing information circuit having a CdS photocell 608, section B is a Wien-bridge oscillation circuit which is adapted to convert the focussing information from the CdS into an electrical oscillation frequency, the reference numeral 603 denotes precise-focussing-point-frequency-selection circuit consisting of resonance circuit or tuned amplifier, and the numeral 604 designates an indicating portion for confirming the precise focussing point. Shown at 605 is a positive bus, at 606 a negative bus, to both of which is inserted a D.C. circuit including a resistor 607 and a CdS 608 used for the focussing information detection, while CdS 608 is placed on the optical axis of a lens or the optical path thereof. The mid point of said D.C. circuit is connected to the base of a transistor 609, whose collector is connected to the negative bus 606 and whose emitter is connected via a variable resistor 610 to the positive bus 605. A sliding element of the variable resistor 610 is connected to the gates of the electric field effect transistors 612 and 613 (which will be referred to as FET hereinafter), the drain thereof being connected to the gate of the FET 615. The drain and source of the FET 615 are connected via resistors 616 and 617 to the positive and negative buses 605 and 606, respectively. The drain of the FET 615 is connected via condensor 618 to the gate of the FET 619 and via a resistor 620 to the positive bus 605. The drain of the FET 619 is connected via a resistor 621 to the negative bus 606, and the source thereof is connected via a parallel circuit including a resistor 622 and a condensor 623, to the positive bus 605. The drain of said FET is connected in common with the drain of the FET 619, and the source thereof is connected via series-conducted-oscillation-constant-setting condensors 624 and 625 to the positive bus 605, while being connected via a feedback-rate-adjusting-variable resistor 626 to the source of the FET 615. The mid point of said condensors 624 and 625 is connected to the drain of the FET 612 and to the gate of the FET 615. The drain of the FET 619 is connected via a coupling condensor 627 to the input end of a precise-focussing-point-frequency-selecting circuit 603. Shown at 628 is a luminance compensating circuit. The output selected by means of the precise-focussing-point-frequency-selecting circuit 603 is indicated at a precise-focussing-point-indicating portion 604. The description will be given to the resistance region of the FETs 612 and 613 used in place of the resistor of the oscillation elements of said Wien-bridge oscillation circuit. In other words, the lower the region in which the voltage across the drain sources of the FETs 612 and 613, the sharper the resistance characteristic across the sources. The resistance thereof may be controlled by the voltage across gate-source. The resistance having such a resistance characteristics is referred to as voltage variable resistance or a channel resistance, which is expressed as being $R_{DS}$ in the following formula:

$$R_{DS} = V_p/2 \, I_{DSS} \, (V_{GS}/V_P - 1) \quad (7)$$

where $I_{DS}$ represents the drain current at the zero voltage across gatesource, $V_P$ is the FET constant pinch-off voltage, $V_{GS}$ is the voltage across gate-source. The formula (7) is illustrated in FIG. 18. It can be seen from the formula (7) that if $V_{GS}$ is zero, $R_{DS}$ is minimum, shown at the point (d) in FIG. 18. In this respect, as the gate voltage is increased, $R_{DS}$ will be increased therewith, and if the value reaches the pinch-off voltage $V_P$, then the channel resistance will exhibit a higher resistance value which is ultimately increased beyond the point (f) in FIG. 18.

As is clearly seen from FIG. 18, the resistance value indicating curve shows a sharp rise in the neighborhood of the point (e) at an exponential rate. The above description is referred to the uprising characteristics of the FET, i.e., the operation in the so-called triode region. However, in the pentode region, i.e., in the region where the voltage across drain-source is higher than the pinch-off voltage, there is a considerably great internal resistance in the range of smaller $V_{GS}$, such that this region may be effectively utilized. As shown in FIG. 18, when $V_{GS}$ is in the range from OV to $-1V$, the variation in $R_{DS}$ is small, and when exceeding $-1V$, it shows sharp increase, such that such a portion may be utilized as the measure to spread the frequency range. However, when the range from $-1V$ to $-2V$ of $V_{GS}$ is used, the portion with less variation such as the range from OV to $-1V$ is preferably for spreading the frequency range. In this case, the increasing rate of $V_{GS}$ should be set to a lesser rate, as compared with the shifting rate of a lens. However, it may be possible to enlarge the detuning extent of the precise focussing point frequency from other frequencies based on the resistance described, because, as is clear from the graduation on the ordinate in FIG. 18, the increasing rate is extremely great as compared with the equi-spacing shifting on the abscissa. This facilitates the detection of the precise focussing point. Furthermore, such a frequency range spreading may be effected by using the voltage variable resistance or a sharp portion of the internal resistance having characteristics similar thereto.

Figure 14:
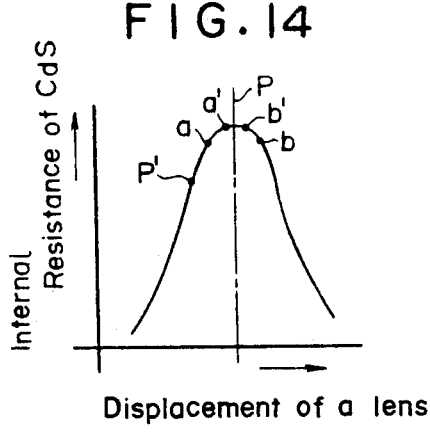
FIG. 14 is a focussing characteristic curve illustrative of the operational principle of the detecting device of the present invention, said detecting device being contemplated to facilitate the detection of the precise focussing point by spreading the frequency region in the vicinity of that corresponding to the precise focussing point.
Figure 19:
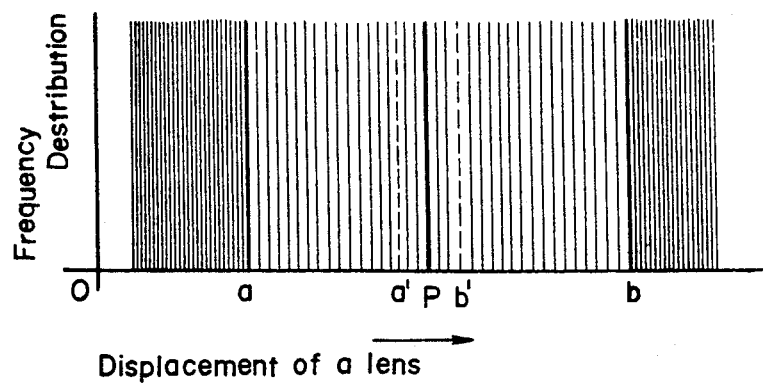
FIG. 19 is a frequency distribution diagram illustrative of the operation as shown in FIG. 17.

The operation of the foregoing embodiment will now be described. When the focussing information of the object is fed to CdS 608, there will be produced a voltage across the terminals of CdS 608. The voltage thus produced is divided by a sliding element 610 of a variable resistor 610 which has been inserted in the emitter circuit of a buffer transistor 609, thereby presenting proper operational voltage across gate-source of the FETs 612 and 613. Under these conditions, when the lens is shifted, starting with the point 0 of the focussing characteristic curve in FIG. 14, past the point (a) and then to the precise focussing point (p), then the internal resistance of the CdS 608 between the points 0-a, due to the shifting of the lens, will be converted into a channel resistance between the points d-e of the FET of FIG. 18, such that the frequency to be oscillated thereby will be extremely higher than the precise focussing point oscillating frequency. This is illustrated as the frequency distribution in FIG. 19, in which the points (a) and (b) are positioned apart from the precise focussing point (p). This indicates the greater detuning degree. As the focussing operation proceeds, and when it reaches the point (a') (which corresponds to the point (a') in the vicinity of the point (f')), then the channel resistance will be increased to a great degree as compared with the point (e). Accordingly, it follows that the frequency of the (a') upright line is materially different from those of the (a), (b) upright lines, thereby facilitating the identification from the latter frequencies. When the lens is further shifted to the precise focussing point (p), the channel resistance of the FET will be increased to reach the point (f) FIG. 18, resulting in the separation of the oscillation frequency of the point (p) from the point (a'), thereby permitting easy selection by using the frequency selection circuit 603 of the precise focussing point. This will be indicated at the indicating portion 604.

Figure 20:
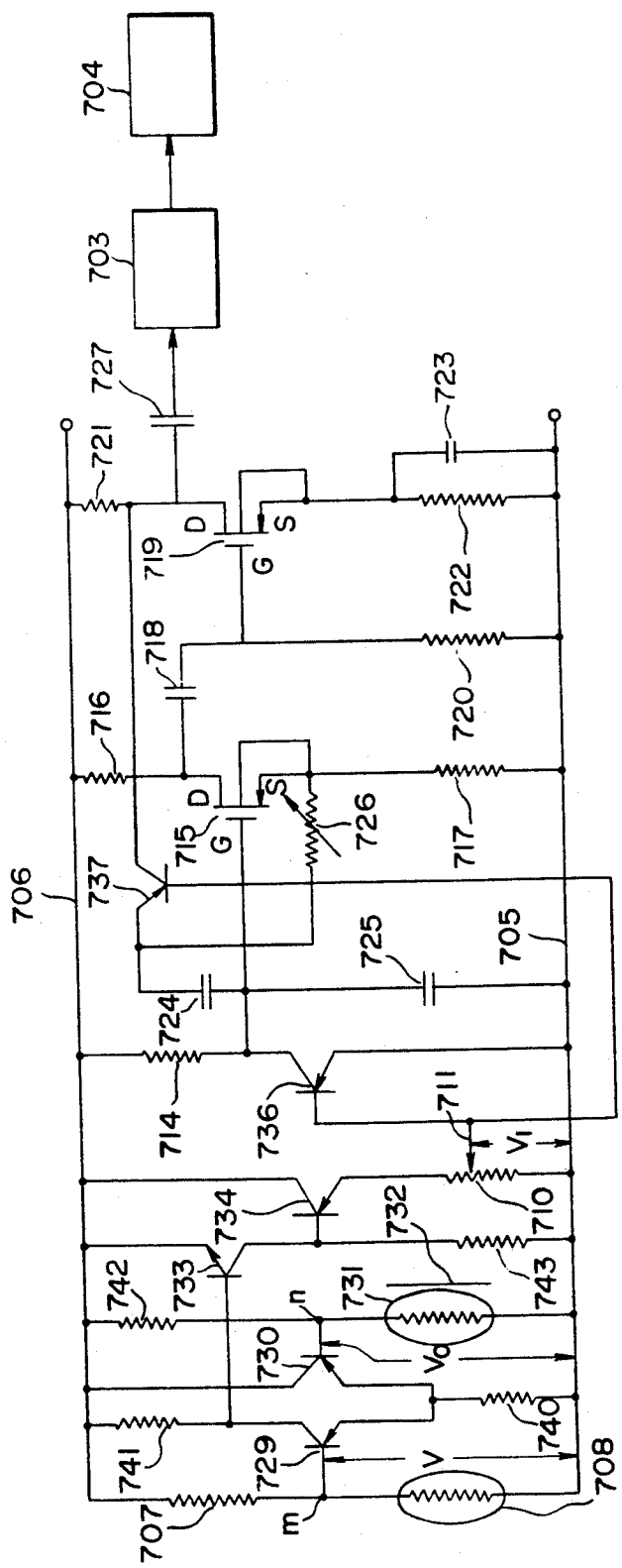
FIG. 20 is a circuit diagram showing the essential part of the embodiment with compensating means for luminance variation added to the embodiment of FIG. 17.

FIG. 20 shows other embodiment of the invention, which is provided with a differential amplifier type luminance compensating device. Shown at 729 and 730 are transistors constituting differential amplifiers, at 731 CdS for detecting the luminance of an object, at 732 a light diffusion plate, at 733 and 734 buffer transistors, at 742 a resistor, at 736 and 737 transistors which are adapted to operate as FETs 612 and 613 as used in the embodiment in FIG. 17.

With the embodiment in FIG. 20, there are provided transistors 736 and 737 in place of FETs 612 and 613. Since the transistors 736 and 737 have characteristics as shown in FIG. 21, said transistors may perform the functions as those of FETs 612 and 613. The characteristics of the transistors will be described with reference to FIG. 21. In general, when actuating the transistor having a great current gain with a minute current, the collector current $I_c$ is given as follows:

$$I_c = \alpha i T^r e^{-V_{go}} \; e^{-V_{BE}'q/KT} \quad (8)$$

wherein $V_{go}$ represents energy gap at $T = 0°$ K, for instance, with silicon, $V_{go} = 1.205$ V.

$\alpha i$ represents a coefficient related to parameter in the base region, r does a constant related to the temperature of the diffusion factor of a carriers lesser in number. For instance, in the case of NPNSi transistor, $r \approx 1.5$.

$V_{BE}$ denotes the impressed voltage across base-emitter. $q$ represents a charge of electron, T the absolute temperature, and K Boltzman constant. As is clear from the formula (8), the collector current $I_c$ increases exponentially by means of impressed voltage $V_{BE}$. Accordingly, the curve therefor varies as shown in FIG. 21, presenting a curve similar to that shown in FIG. 18.

The operation of the embodiment of FIG. 20 will be described hereinafter. Firstly, it is assumed that the voltage V detected at CdS 708 is adjusted beforhand to the same voltage $V_o$ detected at CdS 731 at a certain luminance, and that the position of a lens at this time is on the skirt portion of the focussing characteristic curve, i.e., at the point O. As the lens is shifted, the voltage produced across the terminals of the CdS 708 will be increased, following the focussing characteristic curve. Then, there will result the relationship a $V > V_o$, thereby rendering the transistor 729 conductive. This causes the transistor to respond thereto, thereby producing a divided voltage $V_1$ between the sliding element 711 of the variable resistor 710 and the possitive bus 705. The voltage $V_1$ is then impressed onto the base of the transistors 736 and 737 so as to act as the internal resistance of the FETs 612 and 613 used in the embodiment in FIG. 17. As is shown in FIG. 21, the internal resistance of the transistors 736 and 737 will decrease with the increase in the base input voltage, such that it presents the variation in the oscillation frequency which is different from the previous embodiment, and thus presents higher frequency as it goes closer to the precise focussing point, whereas it presents lower frequency as it becomes apart therefrom. In the case of the use of the internal resistance of the transistors 736 and 737, the frequency will be compressed as shown in the $d$–$e$ curve of FIG. 21, and thereafter increases exponentially. This is similar to that of the previous embodiment. Suppose that the luminance of the object is varied lower, then the resistance of CdS 708 will increase, such that the voltage V at the point M will increase to the value, $V + \Delta V$. It follows that, in the presence of the luminance variation, the focussing operation will be commenced at the voltage, $V + \Delta V = V_o + \Delta V_o$.

Accordingly, if the relationship $\Delta V = \Delta V_o$ is preset, then $V = V_o$, thereby allowing to eliminate the influence by the luminance variation.

While the description on the embodiments of FIGS. 17 and 20 has been given with reference to the Wien-bridge oscillation circuit, a common CR oscillation circuit may be used for this purpose. In addition, the description has also been given to means for detecting the precise focussing point by using the maximum value obtained at CdS. However, the precise focussing point can be obtained in case that the CdS used for detecting the precise focussing point is placed on the optical axis of a lens or the optical path thereof at a point corresponding to the point P′ of the focussing characteristic curve in FIG. 14, since the above means is easily detects the frequency variation.

Lastly, the description will be presented for the embodiment to attain the seventh object of the invention with reference to FIG. 23. Shown at 801 is a known CR oscillator, at 802 a photoelectric element, such as CdS used as a resistance element which governs the oscillation frequency, said photoelectric element being disposed on the optical axis of a lens, being spaced a given distance from the focal plane and serving as a detecting element to obtain the focussing information commensurate to the light-receiving condition. Shown at 803 and 804 are coupling condensors, each one end thereof being connected to the output of the oscillator, while the other ends thereof are connected to a first resonance circuit consisting of a tuning condensor 805 and a tuning coil 806 and to a second circuit consisting of a tuning coil 808, respectively. Shown at 809 is a coupling coil for the tuning coil 806, the other end of which is connected to the base of a transistor 811, while the other end thereof is connected via a resistor 815 to the emitter of a transistor 811. Shown at 810 is a coupling coil for use with the synchronous coil 808, the end thereof being connected to the base of the transistor 812, while the other end thereof is connected to via a resistor 816 to the emitter of the transistor 812. Shown at 813 and 814 are indicating lamps, one end of the lamp 813 being connected to the collector of the transistors 811, the other end thereof being connected to a power source 821, while one end of a lamp 814 is connected to the collector of the transistor 812, the other end thereof being connected to the junction point of the coupling coil 809 with a resistor 815. This junction point is then connected via a motor 819 used for the focussing operation and adapted to shift the lens, to the junction point of the power source 821 with the power source 822. The power sources 821 and 822 have similar voltage, being connected in series, while the negative side of the power source 822 is connected to the junction point of the coupling coil 810 with the resistor 816. Shown at 817 and 818 are by-pass condensors, at 820 a switch which is adapted to short-circuit the both ends of the motor 229.

In this embodiment, the point P′ on the sloped portion of the focussing curve, as shown in FIG. 22, is utilized as detecting reference point. For this purpose, the constants of the first and second resonance circuits should be selected in a manner that the photocell 802, which is disposed on the optical axis of a lens or the optical path thereof at a point spaced a given distance apart from the focal plane, has a higher resonance frequency on the one hand and the lower resonance frequency on the other in a symmetrical fashion with respect to the standard oscillation frequency which is dependent on the internal resistance at the time of precise focussing.

Suppose that the focus is manually set at the object, then the focal plane conforms to the precise focussing point $p$ in FIG. 22, whereupon the oscillator 801 will oscillate at a frequency corresponding to the point $p'$ shown. Since the frequency corresponds to the intermediate frequency between those of both resonance circuits as shown in FIG. 23, neither of the resonance circuits will respond, thereby rendering the transistors 811 and 812 non-conductive, such that the motor 819 remains at a stand still, and both indicating lamps 813 and 814 maintain the off condition. This condition denotes the fact that the precise focus has been obtained, such that the photographer can readily visually confirm it within the view-finder. On the other hand, when the photographic object, such as a man, begins to move, the precise focus will become misaligned, i.e., defocussed. Assuming that the moving direction is given toward the point (a) as viewed in FIG. 22, the internal resistance of CdS will lower with rhe resulting increased oscillation frequency, such that the first resonance circuit, which has been set to a higher frequency side, will resonate, whereupon the resonance voltage thus produced will render the transistor 811 conductive, lighting the indicating lamp 813. At the same time, the current from the power source will flow into the motor 819 on the right as viewed in FIG. 22 to thereby actuate the motor for rotation which in turn shifts the lens so as to maintain the precise focussing point.

On the other hand, when the object moves to the left i.e., toward the point $b$ in FIG. 22, the oscillation frequency will decrease gradually, and then the second resonance circuit, whose resonance frequency has been set to a lower frequency side, will resonate. The output voltage thus produced will render the transistor 812 conductive to thereby light the indicating lamp 814. At the same time, the current from the power source 822 will flow through the motor 819 to the left in FIG. 22, such that the motor 819 will rotate in a direction which is the reverse of that of the previous case to shift the lens in an opposite direction, thereby maintaining the precise focussing point. In practice, it is recommendable to conduct the initial focussing operation according to the following steps. Firstly, the short-circuiting switch 820 of the motor 819 is closed to thereby effect the focussing against the object. In other words, after shifting the lens back and forth to turn lamps on and off alternatively, the both lamps are adjusted so as to be turned off, then the precise focussing point will be obtained. If such an operation can be conducted for a short time and thus exerts no influence on the motor, then the short-circuiting switch 820 may not be necessary.

The description will now be presented for the embodiment to attain the seventh object of the invention with reference to FIG. 24.

Shown at 923 is a transistor, whose base is connected to the emitter of a transistor 911, whose emitter is connected to the junction point of the coupling coil 909 with a resistor 915, and whose collector is connected via an exciting coil of an electromagnetic switch 926 to the power source side of an indicating lamp 913. Shown at 924 is a transistor, whose base is connected to the emitter of a transistor 912, whose emitter is connected to the junction point of a coupling coil 910 with a resistor 916, and whose collector is connected via an exciting coil of an electromagnetic switch 925 to the power source side of an indicating lamp 914. In operation of the embodiment thus constructed, when the first resonance circuit which consists of the tuning condensor 905 and tuning coil 907, resonates, then the transistor 912 will become conductive, while the lamp 913 will be lit, thus causing the motor to rotate. In this respect, the transistor 923 will be brought into a conductive condition by means of a voltage produced at the emitter inserted in resistor 915 of the transistor 911, such that the electromagnetic switch 926, in the collector circuit of the transistor 923, will be actuated to thereby block the circuit of the transistor 912 from the power source 922. It follows then that the influence due to the output of the second circuit consisting of the tuning coil 908 may be prevented.

In passing, although this embodiment uses an electromagnetic switch for cutting off the circuit, a known switching element such as a switching transistor may be used in place of the electromagnetic switch. Furthermore, the breaking of the circuit may be conducted directly in the resonance circuit or any other place, rather than on the power source side so long as the influence due to other circuit system can be avoided.

As is apparent from the foregoing description, according to the embodiments of the present invention, when one resonance circuit causes resonance with the other, the output of the other resonance circuit may be prevented with following advantages: in the case of embodiment as shown in FIG. 23, it is preferable that the resonance frequencies of the both resonance circuits be close to each other to enhance the detecting sensitivity for the precise focussing point. However, the resonance voltage obtained by means of the resonance phenomenon is not of a pulse type but of a diverging type, such that, in case two resonance frequencies are separated to a considerable extent as shown at points (a) and (b) in FIG. 25 (A) to bring the resonance voltage in a separated condition, there will not result overlapping between the both voltages, thereby permitting the accurate identification of the mid point of the points (a) and (b). In contrast thereto, in case the points (a) and (b) are disposed close to each other to improve the detection sensitivity, as shown in FIG. 25 (B), the overlapping point of the both voltages will be raised upwardly, such that the curve between the points (a) and (b) will become flat, thus presenting difficulty in the detection of the precise focussing point.

Nevertheless, according to the embodiment of the present invention as shown in FIG. 24, the resonance of either one of the resonance circuits automatically inhibits the operation of the other circuit to eliminate the interference between the two, such that the resonance frequencies of the both circuits can be preset to a closer extent to each other. For instance, even if the both resonance frequencies are put closer as in FIG. 25 (B), the total characteristics will not be as shown in (c) of FIG. 25 but the resonance voltage between the points (a) and (b) still presents a dip phenomenon, thereby permitting the detection with the accompanied increased sensitivity.

As is apparent from the foregoing description, the present invention provides various advantages for cameras and the like. The present invention provides a method and device for detecting the focussing point with precision by utilizing the principle of converting the focussing information into frequency variation of an A.C. signal and detecting the precise focussing point by means of a highly sensitive frequency detector such as resonance circuits, tuned amplifiers, or a frequency-amplitude convertor whereby to detect the frequency corresponding to the precise focussing point. The present invention permits surprising improvements such as increased detecting sensitivity, insensitivity to voltage and temperature change in circuits, prevention of erroneous detection due to noise or the like, positive detection of the precise focussing point and consistent detection even in the case of varying luminance of the object. This is entirely in contrast to the prior art, in which a minor variation in resistance of the photoelectric element in the neighborhood of the precise focussing point is converted into a A.C. signal.

According to another aspect of the invention, by spreading the frequency region in the neighborhood of the precise focussing point, the frequency corresponding to the precise focussing point can readily be detected with improved accuracy and detecting sensitivity.

Furthermore, according to the automatic focus adjusting device of the present invention, once the focus of the target object is preset to an automatic adjustable range, the detecting operation of the precise focussing point will be conducted by using the sloped portion of the focussing curve with the aid of differential resonance effect of two acute resonance circuits, such that the difference in the focussing information in the neighborhood of the detecting reference point for the precise focussing, can be identified, thus presenting excellent automatic focus adjusting function. In contrast to the prior art in which the both sides of the focussing curve are used for the orientation of the front and rear pins for automatic detection of the precise focussing point, the present invention uses one side of the focussing curve, such that the erroneous detection, which would be incurred in the case of a non-symmetrical focussing curve, can be avoided.

It will be understood that the above description is merely illustrative of preferred embodiments of the invention. Additional modifications and improvements utilizing the discoveries of the present invention can be readily derived by those skilled in the art from the present disclosure, and such modifications and improvements are considered to be within the scope and purview of the invention as defined by the claims that follow.

What is claimed is:

1. A method for detecting the precise focussing point of a lens, comprising the steps of: placing a photoelectric element on the optical path of said lens, said element producing an output indicative of the sharpness of focus;
converting the output of said element to a frequency variation of an A.C. signal; and
detecting from said A.C. signal a signal of a frequency corresponding to said precise focussing point.

2. A method as defined in claim 1, wherein the steps of converting the focussing information into said frequency variation of an A.C. signal is accomplished by controlling a frequency governing portion of an oscillator by means of said photoelectric element.

3. A method as defined in claim 1, wherein the step of converting the focussing information into the frequency variation of an A.C. signal is accomplished by connecting the internal resistance of said photoelectric element as a frequency governing resistance in a CR oscillator.

4. A method as defined in claim 3, wherein said CR oscillator comprises a Wien-Bridge type oscillator.

5. The method of claim 1, wherein said A.C. signal is a sinusoidal signal.

6. A device for detecting the precise focussing point of a lens, comprising: a photoelectric element disposed on the optical path of said lens;
means for converting into electric signal the focussing information received by said element;
an oscillation circuit;
an oscillation frequency setting element in said oscillation circuit, said element being connected to be controlled by means of said electric signal to thereby spread the region in the neighborhood of the frequency representing a precise focussing point; and
a detecting circuit adapted to detect the precise focussing point frequency from said spread frequency region;
whereby to detect the conformity of the focus of said lens to a predetermined focal plane.

7. A device as defined in claim 6, wherein said device is provided with a control means adapted to maintain to a constant value said electric signal relative to the variation in the luminance of the object in focus.

8. An automatic focus adjusting device, comprising:
a photoelectric element disposed on the optical path of a lens at a given distance away for a predetermined focal plane, said element producing an output indicative of the sharpness of focus;
means for converting into electric oscillation frequency the output of said element representing optical focussing information which said element has received;
a pair of resonance circuits having resonance frequencies whose values are symmetrical with respect to the oscillation frequency that is obtained at the time of precise focussing relative to said focal plane, said resonance circuits being adapted to receive said oscillation frequency; and
means to detect the difference in the output from said pair of resonance circuits to determine the precise focussing point.

9. An automatic focus adjusting device as defined in claim 8, wherein a switching means adapted to be actuated by the resonance output from each one of said pair of resonance circuits controls the operation of the other resonance circuit system to thereby control the output therefrom to eliminate the proximity-influence due to the resonance effect, thereby enhancing the detecting sensitivity.

10. A device for detecting a precise focussing point of a lens, comprising: a photoelectric element disposed on the optical path of said lens, said element producing an output indicative of the sharpness of focus;
means for converting the output of said element representing focussing information into an electric oscillating frequency corresponding to the displacement of said lens; and
a resonance circuit producing an output only at a predetermined input frequency connected to receive said electric oscillating frequency from said converting means to produce a resonance output which serves as precise focussing signal.

11. The device of claim 10, wherein said oscillating frequency from said converting means is a sinusoidal signal.

12. A device for detecting the precise focussing point of a lens, comprising: a photoelectric element disposed on the optical path of said lens, said element producing an output indicative of the sharpness of focus of an object imaged by the lens;
means for converting the output of said element representing focussing information into an electric oscillating frequency corresponding to the displacement of said image;
a resonance circuit whose resonance frequency is controlled in response to the variation in the luminance of said object, said circuit being connected to receive said electric oscillation frequency and to produce the resonance circuit output as the precise focussing signal, said resonance circuit being adapted to cause resonance only with an oscillation frequency related to a given focussing point.

13. The device of claim 12 wherein said oscillating frequency from said converting means is a sinusoidal signal.

14. A device for detecting the precise focussing point of a lens, comprising: a photoelectric element disposed on the optical path of a lens, said element producing an output indicative of the sharpness of focus;
means for converting the output of said element at the time of precise focussing, into an electric oscillation frequency corresponding to the displacement of said lens;
a resonance circuit connected to receive said oscillation frequency and being adapted to produce a resonance circuit output at resonance only when the oscillation frequency is related to a given focussing point, said resonance circuit output serving as the precise focussing signal; and
means for controlling said oscillation frequency so as to be equal to said resonance frequency when related to said focussing point regardless of the variation in luminance of the object in focus.

15. A device for detecting the precise focussing point of a lens, comprising: a photoelectric element disposed on the optical path of said lens, said element producing an output indicative of the sharpness of focus;
means for converting into a corresponding electric oscillating frequency the output of said element representing focussing information which said cells have received, and a tuned amplifier connected to receive the converting means output adapted to select a predetermined frequency among said electric oscillating frequencies;

whereby to detect, by using the output thus selected, the conformity of the focus of said lens to a predetermined focal plane.

16. A device as defined in claim 15, wherein said tuned amplifier includes a photoelectric element for determining a selected central frequency of said tuned amplifier; and said device further comprises:

means for shifting said selected central frequency of said tuned amplifier for detecting the precise focusing point in such a manner that said selected central frequency conforms to the oscillation frequency from said converting means which varies depending on the variation in the luminance of said object.

17. A device for detecting the precise focussing point of a lens, comprising: a photoelectric element disposed on the optical path of said lens, said element producing an output indicative of the sharpness of focus;

means to convert into electric oscillating frequency the output of said element representing optical focussing information of said object which said element has received;

a frequency-amplitude convertor adapted to convert variation in the output frequency of said converting means into variations in an output amplitude;

a detector adapted to detect the variation in said output amplitude;

a precise focussing indicator adapted to indicate said output amplitude; and whereby the output from said converting means is fed to said frequency-amplitude convertor to thereby have a predetermined extreme value of said output amplitude indicated on said indicator.

18. A device as defined in claim 17, wherein the attenuation slope region of an electric wave filter is utilized as said frequency-amplitude convertor.

19. A device for detecting the precise focusing point of a lens, comprising:

a photoelectric element disposed on the optical path of said lens, said element producing an output indicative of the sharpness of focus;

means for converting the output of said element into an electric oscillating frequency signal; and means for detecting from said converting means frequency signal a signal having a frequency corresponding to said precise focusing point.

20. The device of claim 19, wherein said oscillating signal from said converting means is a sinusoidal signal.

21. Apparatus for detecting the precise focusing point of a lens, comprising:

a controlled variable frequency sinusoidal oscillator circuit including a sinusoidal frequency determining subcircuit which includes, as an active component therein, a photoelectric element situated on the optical path of said lens so as to be electrically responsive to the sharpness of focus of said lens; and tuned narrow bandpass filter means connected to receive the sinusoidal output of said oscillator circuit for providing an output indicative of a particular frequency of said oscillator output corresponding to the condition in which the image is optimally focused.

* * * * *